United States Patent [19]
Kleinmann

[11] 3,793,976
[45] Feb. 26, 1974

[54] MULTILAYERED, INSULATED FLUID TANK AND STRUCTURE

[75] Inventor: Earl E. Kleinmann, Bartlesville, Okla.

[73] Assignee: Phillips Petroleum Company, Bartlesville, Okla.

[22] Filed: Jan. 29, 1973

[21] Appl. No.: 327,736

[52] U.S. Cl. .............. 114/74 A, 220/9 LG, 220/15
[51] Int. Cl. ............................................. B63b 25/16
[58] Field of Search........ 114/74 R, 74 A, 65 R, 72; 220/9 LG, 9 A, 10, 11, 14, 15; 248/146, 298, DIG. 1; 49/413, 504, DIG. 1

[56] References Cited
UNITED STATES PATENTS

| | | | |
|---|---|---|---|
| 3,692,205 | 9/1972 | Cowles et al. ................ | 114/74 A X |
| 3,648,879 | 3/1972 | Jackson ............................ | 220/9 LG |
| 3,547,302 | 12/1970 | Jackson et al. ................ | 114/74 A X |
| 3,147,728 | 9/1964 | Ishii et al. ......................... | 114/74 R |
| 2,738,749 | 3/1956 | Macy et al. ...................... | 114/74 R |

Primary Examiner—Duane A. Reger
Assistant Examiner—Randolph A. Reese

[57] ABSTRACT

A multilayered, insulated fluid tank having supporting elements for maintaining the tank spaced from the structure and holding elements for attaching the multilayers of the tank one to the other and yet provide for some movement of the tank. Elongated attaching elements attach the various tank sections together to provide a continuous interior surface.

10 Claims, 10 Drawing Figures

PATENTED FEB 26 1974 3,793,976

MULTILAYERED, INSULATED FLUID TANK AND STRUCTURE

This invention relates to a fluid containment system. In one aspect, it relates to a fluid containment system especially adapted for containing cold liquids in liquid transport ships.

In providing storage tanks for use in the maritime transport of liquefied natural gas, three important considerations are: safe fluid-tight storage space, adequate thermal insulation to minimize boiling of the stored product and to protect the ship's structure from exposure to extreme cold, and cost of construction. An object of the present invention is to provide safe, fluid-tight storage space, with adequate thermal insulation, at reasonable cost.

This invention, therefore, resides in insulating an impervious member forming a multilayered, insulated fluid tank, means for connecting the layers one to the other, and maintaining the tank spaced from a structure such as a ship hull, for example.

Other objects and the several advantages of the invention will be apparent from a study of the disclosure, the drawing, and the appended claims.

The drawings are diagrammatic views of the apparatus of this invention.

Figure 3:
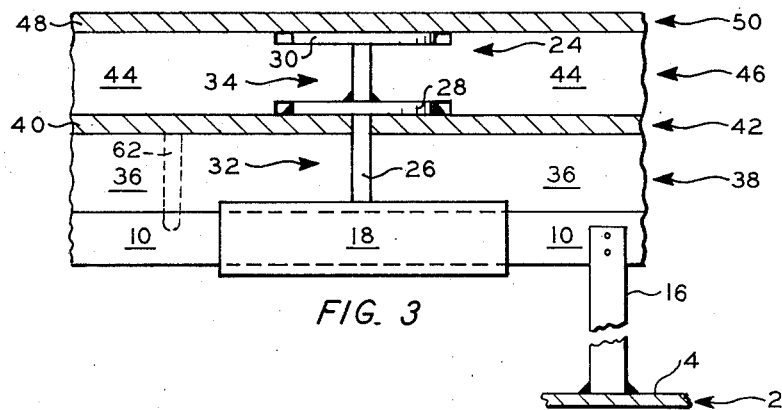
Figure 4:
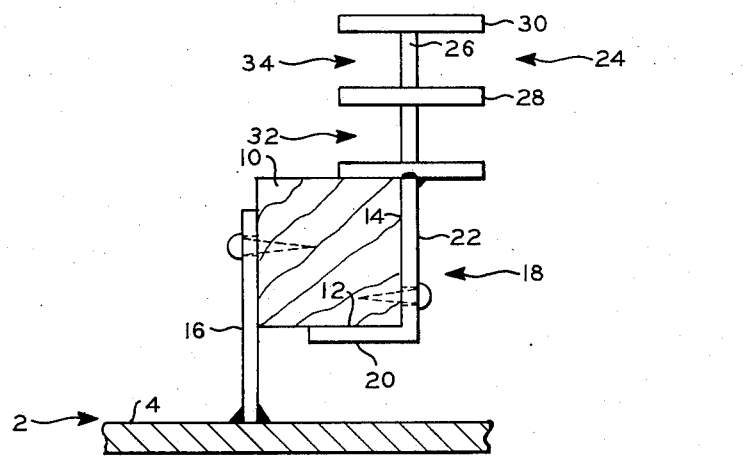
Figure 5:
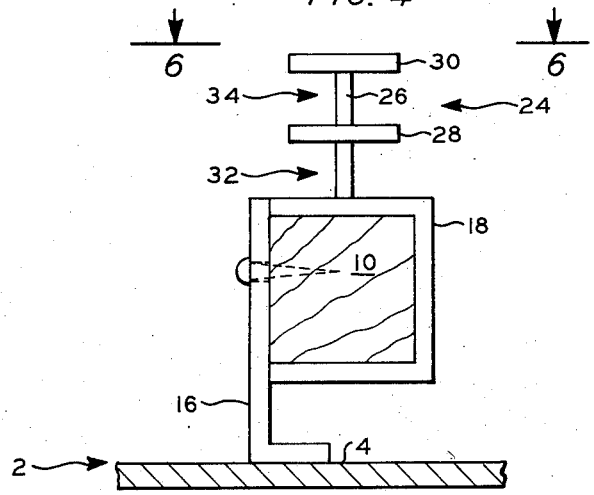
Figure 6:
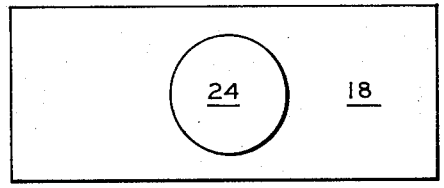
Figure 7:
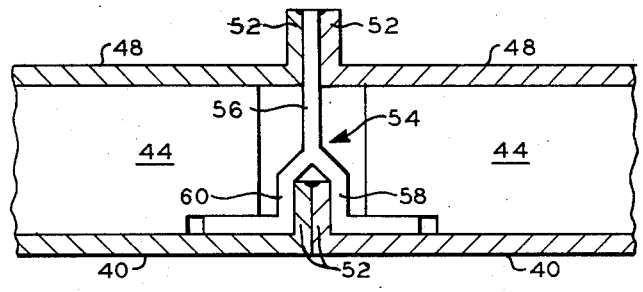
Figure 8:
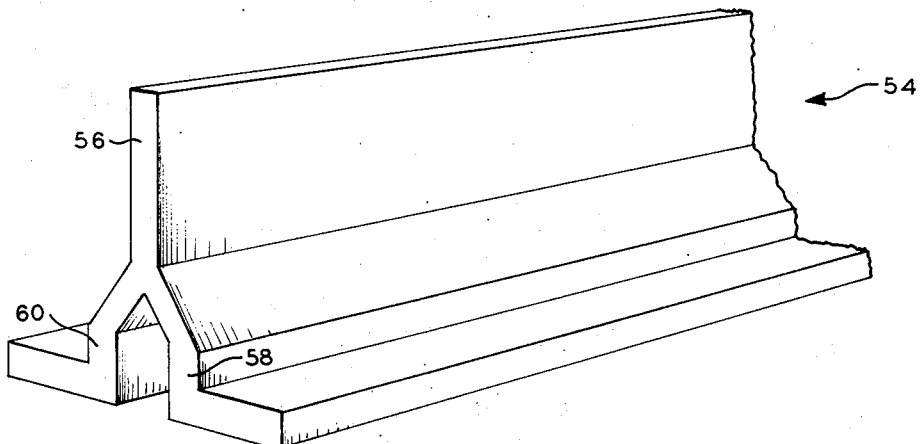
Figure 9:
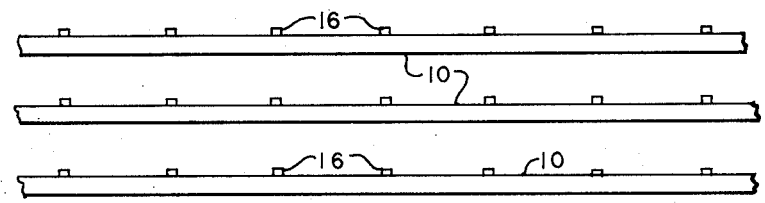
Figure 10:
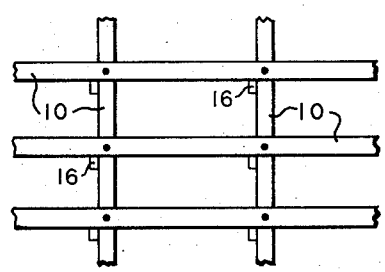

FIG. 3 shows a partial sectional view of the multiple layers of a tank and a connecting element, FIG. 4 shows one embodiment of the connecting element, FIG. 5 shows another embodiment of the connecting element, FIG. 6 shows a plan view of the connecting element of FIG. 5, FIG. 7 shows a partial sectional view of an attaching element, FIG. 8 shows an isometric view of a portion of the attaching element, FIG. 9 shows one embodiment of the supporting elements, and FIG. 10 shows another embodiment of the supporting elements.

Figure 1:
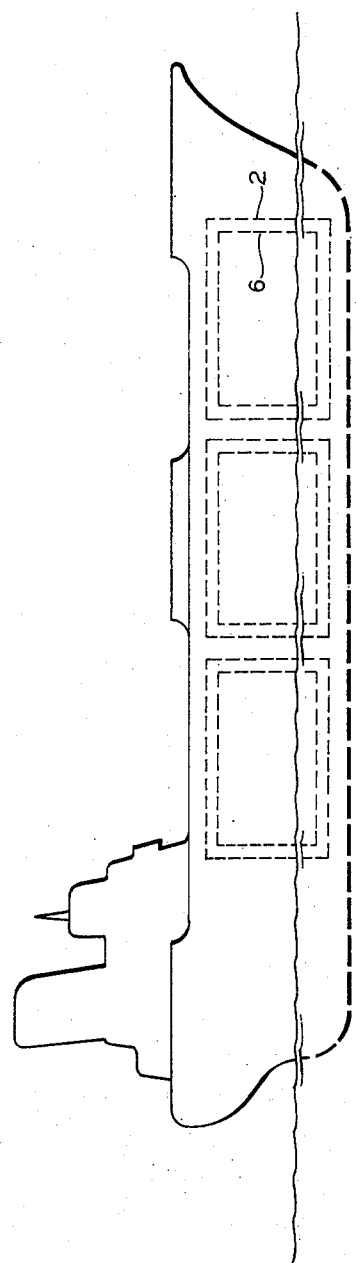
FIG. 1 is a side view of a ship having fluid tanks therein.
Figure 2:
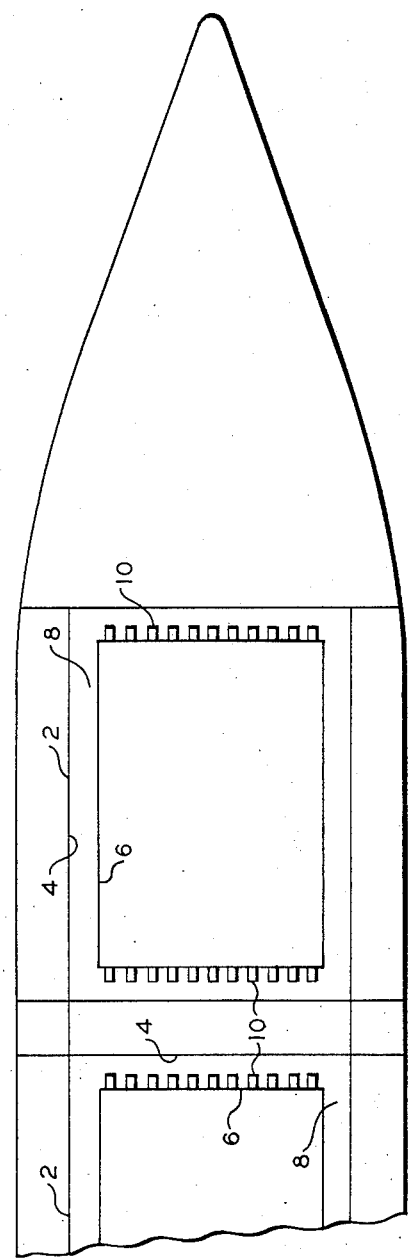
FIG. 2 is a plan view in partial section of the ship and the fluid tanks.

Referring to FIGS. 1 and 2, a structure 2 such as the hull or other portions of an ocean-going tanker ship, for example, has an inner surface 4. The multilayered, insulated tank 6 is attached to the inner surface 4 of the structure 2 and is spaced from said inner surface 4. Insulating material 8, such a perlite, for example, is positioned in the space between the tank 6 and the structure 2. There can also be more than one tank 6 per ship.

Referring to FIGS. 3, 4 and 5, a plurality of elongated supporting elements 10, each having adjacent sides 12, 14, are formed of material which has a low conductivity of heat, and are connected to the inner surface 4 of structure 2 and maintained at locations spaced preselected distances one from the other and from the inner surface 4. An example of the elongated supporting elements would be wooden beams.

The spacing of supporting elements 10 from one another depends on the size of the materials utilized for forming the multiple layers of the tank 6. Once these dimensions have been established, one skilled in the art can determine the desirable spacing between elements 10 to assure sufficient support of the tank 6.

Referring to FIGS. 9 and 10, the supporting elements 10 can be placed in parallel rows of elements, gridworks, or other layouts to provide desirable support.

Referring to FIGS. 4 and 5, the supporting elements 10 are connected to the structure 2 and maintained spaced therefrom by, for example, elongated beams 16 or by other means known in the art. In one example connection, one end of the beam 16 is welded to the inner surface 4 of the structure 2 and the other end is fixed to a respective supporting element 10. FIG. 4 shows the beam 16 nailed or bolted to the supporting element 10. FIG. 5 shows another embodiment where the beam 16 is connected to a supporting element 10 which in turn is connected to the connecting element 18.

Referring to FIGS. 3–6, the connecting element 18 has at least first and second portions 20, 22 and a multiple-flanged holding element 24 having a core 26. Each connecting element 18 is positioned at a preselected location on a respective supporting element 10 with the first and second portions 20, 22 contacting adjacent sides 12, 14 of the element 10, and is fixedly attached to said supporting element 10 with its respective core 26 oriented in a direction from the adjacent inner surface 4 of the structure 2 toward the tank 6. Holding element 24 has at least first and second spaced-apart flanges 28, 30 extending generally perpendicularly outwardly from the core 26 forming at least first and second slots 32, 34 extending annularly about the core 26.

The holding element 24 is preferably formed of metal. One example would be washers forming the flanges 28, 30 with said washers being welded to a metal pin which forms a core 26 and which in turn is welded to, for example, the second portion of the connecting element 18.

Referring to FIG. 3, first rigid wall members 36, for example wood, preferably plywood sheets, are positioned in first slots 32 of respective holding elements 24 for forming an insulating first, outermost layer 38 of the tank 6. First membrane or Invar metal members 40 are positioned in first slots 32 of respective flanged elements 24 at a location adjacent and inboard of the first layer 38 and are sealably connected one to others and to the respective second flanges 28 for forming an impervious second layer 42 of the tank 6. Second rigid wall members 44, for example wood members, like members 36, are positioned in second slots 34 of respective holding elements 24 at a location adjacent and inboard of the second layer for forming an insulating third layer 46 of the tank 6. Second Invar metal members 48 are positioned adjacent and inboard the third layer 46, covering the connecting elements 18, and are sealably connected one to others for forming an impervious fourth layer 50 of the tank 6. As known in the art, the membrane Invar metal members 48 can be butted or overlapped and welded together. It should also be understood that Invar metal members are used for illustrative purposes and that other membrane members which have a low coefficient of expansion can be used.

FIG. 7 shows a preferred method of connecting the Invar metal members 40 and 48. In this preferred embodiment, the first and second membrane members 40, 48 have edge portions 52 which are disposed about 90° relative to the body of the member. These edge portions 52 in the installed position are preferably directed toward the inside of the tank being formed. Elongated attaching elements 54 are utilized for sealably attaching the second membrane members 48 together and maintaining the second rigid wall members relative to the associated second membrane members 48.

As shown in FIGS. 7 and 8, the attaching elements 54 have first, second and third portions 56, 58 and 60. The first portion 56 extends between the edge portions 52 of the second Invar members 48 and is sealably connected thereto by welding, for example. The second portion 58 extends from the first portion 56, over the edge portion 52 of an adjacent first Invar member 40, and extends a distance between said adjacent first Invar member 40 and its associated second rigid wall member 44. The third portion 60 extends from the first portion 56, over the edge portion of another adjacent first Invar member 40, and extends a distance between said other adjacent first Invar member 40 and its associated second rigid wall member 44. As shown in FIG. 8, the attaching element 54 can be easily formed from a metal sheetstock by cutting and bending same to form the second and third portions thereof.

In order to further increase their sturdiness, the first rigid wall members 36 can be connected to respective elongated supporting elements 10 along the length thereof by pins 62 or nails, for example.

By forming and securing the tank as set forth above, the multiple layers forming the tank are maintained at their desired position yet provide for some movement during movement of the structure 2 in rough weather, thereby preventing damage to the tank 6.

The layers 38, 42, 46 and 50 of the tank 6 contact one another over substantially their entire face surface areas to provide rigidity, yet the various layers can move independently to avoid damage to the tank and/or the ship structure which might result in the waste of valuable product contained therein.

Reasonable variations or modifications can be made, or followed, in view of the foregoing disclosure, without departing from the spirit and scope thereof.

What is claimed is:

1. In combination with a structure having an inner surface, a multiple-layered, insulated fluid tank, comprising:
   a plurality of elongated supporting elements each having adjacent sides and being of a low heat-conducting material;
   means for connecting the elongated supporting elements to the inner surface of the structure and maintaining said elements spaced one from the other and from said inner surface;
   a plurality of connecting elements each having at least first and second portions and a multiple-flanged holding element having a core, said connecting elements each being positioned at preselected locations on a respective elongated supporting element with the first and second portions contacting adjacent sides of and being attached to said supporting element with said core being oriented in a direction from the inner surface of said structure and said multiple-flanged holding elements having at least first and second spaced-apart flanges each extending generally perpendicularly outwardly from the core and forming at least first and second slots;
   a plurality of first rigid wall members each positioned in first slots of respective flanged holding elements forming an insulating first layer of the tank;
   a plurality of first membrane members positioned in first slots of respective flanged elements spaced inwardly from the first layer and being sealably connected one to another and to respective second flanges for forming an impervious second layer of the tank;
   a plurality of second rigid wall members each positioned in second slots of respective flanged holding elements spaced inwardly from the second layer for forming an insulating third layer of the tank; and
   a plurality of second membrane members positioned within the third layer, covering the connecting elements, and being sealably connected one to another for forming an impervious fourth layer of the tank.

2. The combination of claim 1 including means connecting the first rigid wall members to respective elongated supporting elements at preselected locations along the length of said supporting elements.

3. The combination of claim 1 including insulating material positioned in a space between the first layer of the tank and the structure.

4. The combination, as set forth in claim 1, wherein the first and second rigid wall members are formed of wood.

5. The combination, as set forth in claim 1, wherein the elongated supporting elements are formed of wood.

6. The combination, as set forth in claim 1, wherein the connecting elements encompass the elongated supporting elements.

7. The combination, as set forth in claim 1, including said first membrane members having edge portions extending toward adjacent second membrane members and said adjacent second membrane members having edge portions directed in a common direction as said edge portions of the adjacent first membrane members; and a plurality of elongated attaching elements having first, second and third portions, said first portion extending between edge portions of second membrane members and being sealably connected thereto, said second portion extending from the first portion over the edge portion of an adjacent first membrane member, and extending a distance between said first membrane member and its associated second rigid wall member, said third portion extending from the first portion, over the edge portion of another adjacent first membrane member, and extending a distance between said other adjacent first membrane member and its associated second rigid wall member for sealably attaching the elongated attaching elements to the second membrane members and maintaining the second rigid wall members relative to the associated second membrane members.

8. The combination, as set forth in claim 1, including a second plurality of elongated supporting elements each having adjacent sides, being of a low heat-conducting material, and being spaced one from the other and oriented generally perpendicularly relative to the first plurality of elongated supporting elements, said second plurality of elongated supporting elements being associated with and connected to the associated elements of the fluid tank of said first plurality of supporting elements.

9. The combination, as set forth in claim 1, wherein the first membrane members are in contact with associated first and second rigid wall members and the second rigid wall members are each in contact with associated first and second membrane members.

10. The combination, as set forth in claim 9, wherein the contacting associated members each contact one another over substantially an entire face surface of each.

* * * * *